H. KOCOUREK.
SPEED INDICATOR FOR TALKING MACHINES.
APPLICATION FILED JAN. 2, 1915.
1,219,112.
Patented Mar. 13, 1917.
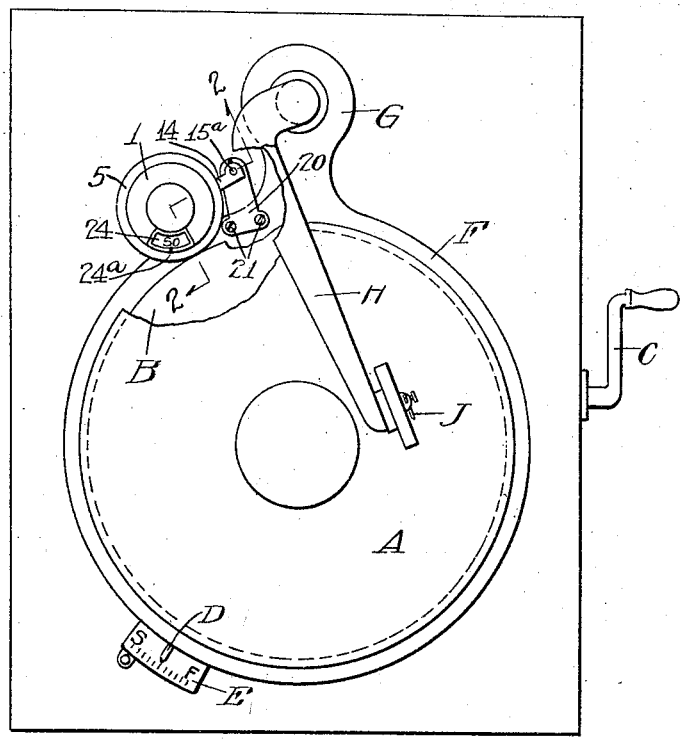
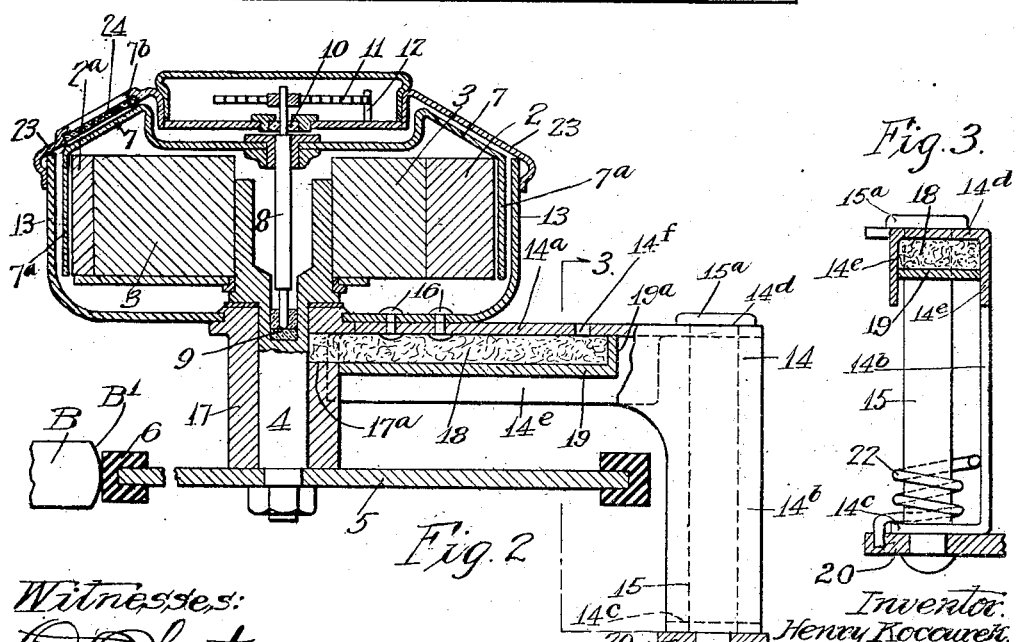

UNITED STATES PATENT OFFICE.

HENRY KOCOUREK, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEED-INDICATOR FOR TALKING-MACHINES.

1,219,112.    Specification of Letters Patent.    Patented Mar. 13, 1917.

Application filed January 2, 1915. Serial No. 211.

*To all whom it may concern:*

Be it known that I, HENRY KOCOUREK, a citizen of the United States, residing at Chicago, in the county of Cook and State of Illinois, have invented certain new and useful Improvements in Speed-Indicators for Talking-Machines, of which the following is a specification, reference being had to the accompanying drawings, forming a part thereof.

This invention relates to a substantially designed speed indicator for showing the speed of operation of a phonograph. It consists of the features and elements described and shown in the drawings, as indicated by the claims.

In the drawings:

Figure 1 is a top plan view of a talking machine or "phonograph" showing a speed indicator embodying this invention applied thereto.

Fig. 2 is an enlarged detail section of the speedometer taken as indicated at line, 2—2, on Fig. 1.

Fig. 3 is a detail section taken as indicated at line, 3—3, on Fig. 2.

The talking machine illustrated in the drawings is the type in which a record disk, A, is carried upon a revolving table, B, usually driven by a spring motor whose winding crank is indicated at C. The speed of the motor is controlled usually by some form of centrifugal governor, not shown, and is rendered variable through a limited range by adjustment of such governor, the adjusting means being indicated as a combined handle and pointer, D, traversing a short scale, E. The mechanism of the particular machine illustrated is carried in a metal frame having an annular portion, F, which is circular in outline except for an extension, G, in which is carried the hollow arm, H, which supports the reproducing stylus, J, and its allied mechanism, and communicates with the sound amplifying chamber below the revolving table, B.

As is well understood, even a slight variation in the speed of revolution of the table, B, will cause a change of pitch in the sounds as reproduced by the instrument, and it is therefor desirable to know at what particular speed the table, B, is revolving so that the proper speed may be selected to produce the most pleasing results. The speed indicator, 1, which is designed to serve this purpose is shown as the magnetic type comprising a ring magnet, 2, mounted on a non-magnetic core, 3, which is carried upon a rotatable shaft, 4, provided with a wheel, 5, whose rim carries a rubber tire, 6, for frictional engagement with the periphery, B¹, of the table, B. The magnet, 2, may be reduced in cross section at 2ª to throw out a portion of its flux into the adjacent space for creating a magnetic drag upon the non-magnetic drag disk, 7, which is shown carried on a spindle, 8, stepped in a jewel bearing, 9, which is carried in a hollowed out portion of the shaft, 4. An annular jewel bearing, 10, supports the upper end of the spindle to which is secured one end of a spiral biasing spring, 11, whose other end is fixed to a post, 12. The outer casing, 13, will preferably be composed of magnetic metal such as steel for the purpose of strengthening the magnetic field in which the cylindrical skirt, 7ª, of the drag disk, 7, hangs.

This mechanism is supported by a swinging arm, 14, formed of sheet metal, as indicated in Fig. 3, comprising a horizontal portion, 14ª, of inverted U-shaped cross section, one wall of which is extended to form the vertical portion, 14ᵇ, carrying at its lower end the lug, 14ᶜ, which pivotally engages the post, 15. The upper end of the post extends through the flat portion, 14ᵈ, of the U, and is formed with a head, 15ª, to hold the arm, 14, in position. Rivets, 16, secure the casing, 13, to the top of the arm, 14, near its opposite end, while the flanged portions, 14ᵉ, about the hub, 17, of the casing which serves as a journal bearing for the shaft, 4. The hub, 17, is provided with an aperture, 17ª, registering with the open end of the U-shaped arm, 14, and an oil wick, 18, is housed in this arm extending into said aperture, 17ª, being supported in position by a bottom wall, 19, held frictionally between the flanges, 14ᵉ, and having its end bent up at 19ª to form a closure for the wick housing. The top of the arm, 14, is apertured at 14ᶠ to permit renewal of the oil supply in the wick, 18.

The post, 15, is fixed upright in the mounting plate, 20, which is secured by two screws, 21, to the annular portion, F, of the metallic mounting of the phonograph mechanism, and the friction wheel, 5, is held against the periphery of the revolving table, B, by means of a spring, 22, coiled about the post, 15, and having one end engaged in the plate, 20, while its opposite end reacts against the vertical wall, 14ᵇ, of the arm, 14.

In the type of talking machine or phonograph illustrated, the revolving table, B, is substantially horizontal, as is the plane of revolution of the magnet, 2. As is well understood the drag disk, 7, is rotatably displaced from a normal position by an amount proportional to the speed of rotation of the magnet, 2; graduations carried by the drag disk, 7, may thus be compared with the fixed position of a zero line to indicate the speed of rotation measured by the instrument. To render such graduations easily read they are placed upon a surface of the cup-shaped disk, 7, which extends at an obtuse angle to the skirt, 7ᵃ, as shown at 7ᵇ, and a similarly sloping cover, 23, of the instrument is provided with a window, 24, through which such graduations may be observed. Preferably an index point, 24ᵃ, is formed in the outline of the window, 24, as shown in Fig. 1.

I claim:—

1. In a speed indicator comprising a casing, a vertical shaft therein; a journal bearing for said shaft at the lower portion of said casing, and a supporting arm secured to the casing and extending transversely of said shaft, said journal bearing having an aperture and said arm being hollow with its bore connecting with said aperture, and an oil wick in said hollow arm extending into said aperture, the arm having an aperture beyond the casing to admit oil to said wick.

2. In combination with a speed indicator, a support for the purpose indicated comprising a pivot post and an arm of sheet metal having a portion which extends parallel to said post with one edge bent at right angles to said portion and pivotally engaging the post, and with a lug bent at right angles to said portion at its opposite edge also pivotally engaging said post, and means securing the speed indicator casing to the said bent edge of the arm at the end opposite the pivot post.

3. In combination with a speed indicator, a support for the purpose indicated, comprising a pivot post and a bracket of sheet metal comprising two arms substantially at right angles to each other, one of said arms being folded into channel form, one side of the channel comprising the other arm, the remote end of said other arm being bent to form a lug parallel with the web of said channel, said web and said lug being pivotally engaged with the post, and the end of said channel remote from the pivot being provided with means for securing the speed-indicator casing thereto.

In testimony whereof, I have hereunto set my hand at Chicago, Illinois, this 24th day of December, 1914.

HENRY KOCOUREK.

Witnesses:
 ROBT. N. BURTON,
 EDNA M. MACINTOSH.